(12) United States Patent
Chou et al.

(10) Patent No.: US 12,273,938 B2
(45) Date of Patent: *Apr. 8, 2025

(54) SYSTEM AND METHOD OF MANAGING PNF CONNECTIVITY IN A NETWORK SLICE INSTANCE

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/844,652

(22) Filed: Jun. 20, 2022

(65) Prior Publication Data
US 2022/0394785 A1 Dec. 8, 2022

Related U.S. Application Data

(63) Continuation of application No. 16/296,971, filed on Mar. 8, 2019, now Pat. No. 11,382,150.
(Continued)

(51) Int. Cl.
*H04W 76/11* (2018.01)
*G06F 9/455* (2018.01)
(Continued)

(52) U.S. Cl.
CPC ......... *H04W 76/11* (2018.02); *G06F 9/45558* (2013.01); *H04W 76/22* (2018.02); *G06F 2009/45595* (2013.01); *H04W 48/18* (2013.01)

(58) Field of Classification Search
CPC ..... H04W 76/11; H04W 76/22; H04W 48/18; G06F 9/45558; G06F 2009/45595
See application file for complete search history.

(56) References Cited

U.S. PATENT DOCUMENTS 9,769,694 B2 *   9/2017   Chou ............... H04W 28/0236
10,924,943 B2 *  2/2021   Chou ..................... H04W 24/02
(Continued)

FOREIGN PATENT DOCUMENTS

CN        109842892 B   * 11/2020   ............ H04W 24/02

OTHER PUBLICATIONS

Network Functions Virtualisation (NFV) Management and Orchestration 2014 ETSI Industry Specification Group (ISG) V1.1.1.*
(Continued)

*Primary Examiner* — Ajit Patel
*Assistant Examiner* — Wilfred Thomas
(74) *Attorney, Agent, or Firm* — Kowert, Hood, Munyon, Rankin & Goetzel, P.C.

(57) ABSTRACT

Systems and methods of managing PNF connectivity are provided. A NM determines to add to or remove external connectivity from a PNF and transmits a NS update request to a NFVO that contains an identifier of the NS instance to be updated, an indication of a type of update operation requested, and information of the PNF connectivity to be changed. A NS update response contains a lifecycle operation occurrence identifier identifying a NS lifecycle operation occurrence. Separate NS lifecycle change notification from the NFVO indicate that a NS update to change the connectivity of the PNF has started and a result of the change. The notifications include the lifecycle operation occurrence identifier.

20 Claims, 7 Drawing Sheets

Related U.S. Application Data

(60) Provisional application No. 62/648,335, filed on Mar. 26, 2018.

(51) Int. Cl.
*H04W 48/18* (2009.01)
*H04W 76/22* (2018.01)

(56) References Cited

U.S. PATENT DOCUMENTS

| | | | |
|---|---|---|---|
| 11,405,798 B2* | 8/2022 | Yao | H04W 84/00 |
| 2016/0149771 A1 | 5/2016 | Prasad et al. | |
| 2016/0337172 A1 | 11/2016 | Yu et al. | |
| 2017/0012823 A1 | 1/2017 | Zhu et al. | |
| 2017/0012898 A1 | 1/2017 | Zhu et al. | |
| 2017/0171015 A1 | 6/2017 | Lin | |
| 2017/0315844 A1 | 11/2017 | Ji et al. | |
| 2018/0018192 A1* | 1/2018 | Gokurakuji | H04L 67/10 |
| 2018/0024852 A1* | 1/2018 | Yabushita | G06F 9/50 718/1 |
| 2018/0034781 A1 | 2/2018 | Jaeger et al. | |
| 2018/0046477 A1* | 2/2018 | Aelken | G06F 9/5072 |
| 2018/0145889 A1 | 5/2018 | Xu et al. | |
| 2018/0146031 A1* | 5/2018 | Li | H04L 41/5009 |
| 2018/0174477 A1 | 6/2018 | Johnson | |
| 2018/0262410 A1 | 9/2018 | Chou et al. | |
| 2018/0270111 A1* | 9/2018 | Oohira | G06F 9/45558 |
| 2018/0295067 A1* | 10/2018 | Xia | H04L 41/5003 |
| 2018/0316730 A1 | 11/2018 | Schaefer et al. | |
| 2019/0050248 A1 | 2/2019 | Oohira et al. | |
| 2019/0065234 A1* | 2/2019 | Zembutsu | H04L 47/82 |
| 2019/0109768 A1 | 4/2019 | Senarath et al. | |
| 2019/0208404 A1 | 7/2019 | Georgiev | |
| 2019/0253907 A1 | 8/2019 | Yao et al. | |
| 2019/0273668 A1 | 9/2019 | Xia | |
| 2019/0327621 A1* | 10/2019 | Chou | H04L 41/0895 |
| 2019/0363924 A1* | 11/2019 | Tse | G06F 9/5077 |
| 2020/0084091 A1 | 3/2020 | Iovene et al. | |
| 2020/0084107 A1* | 3/2020 | Li | H04L 65/40 |
| 2020/0322232 A1* | 10/2020 | Xia | H04L 41/5041 |

OTHER PUBLICATIONS

Intel, 3GPP TSG SA WG5 (Telecom Management) Meeting #111, S5-171073 Jan. 16-20, 2017, Porto, Portugal.

Intel, 3GPP TSG SA WG5 Meeting #111, S5-171074 Jan. 16-20, 2017, Porto, Portugal.

Network Functions Virtualisation (N FV);Management and Orchestration;Os-Ma-Nfvo reference point-Interface and Information u Model Specification Oct. 2016, ETSI Industry Specification Group (ISG).

Life Cycle Management (LCM) for mobile networks that include virtualized network functions Nov. 2016, 3GPP .TS 28.526. V 0.3.0.

* cited by examiner

SYSTEM AND METHOD OF MANAGING PNF CONNECTIVITY IN A NETWORK SLICE INSTANCE

PRIORITY CLAIM

This application is a continuation of U.S. patent application Ser. No. 16/296,971, filed Mar. 8, 2019, which claims the benefit of priority under 35 U.S.C. 119(e) to U.S. Provisional Patent Application Ser. No. 62/648,335, filed Mar. 26, 2018, which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and 5th generation (5G) networks. Some embodiments relate to network slice instances and management of connectivity therein.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) systems.

To add further complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs). The use of NFV may provide flexibility in configuring network elements, enabling dynamic network optimization and quicker adaptation of new technologies. As 5G systems develop, management of the change in connectivity for physical network functions (PNFs) instances has yet to be addressed.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
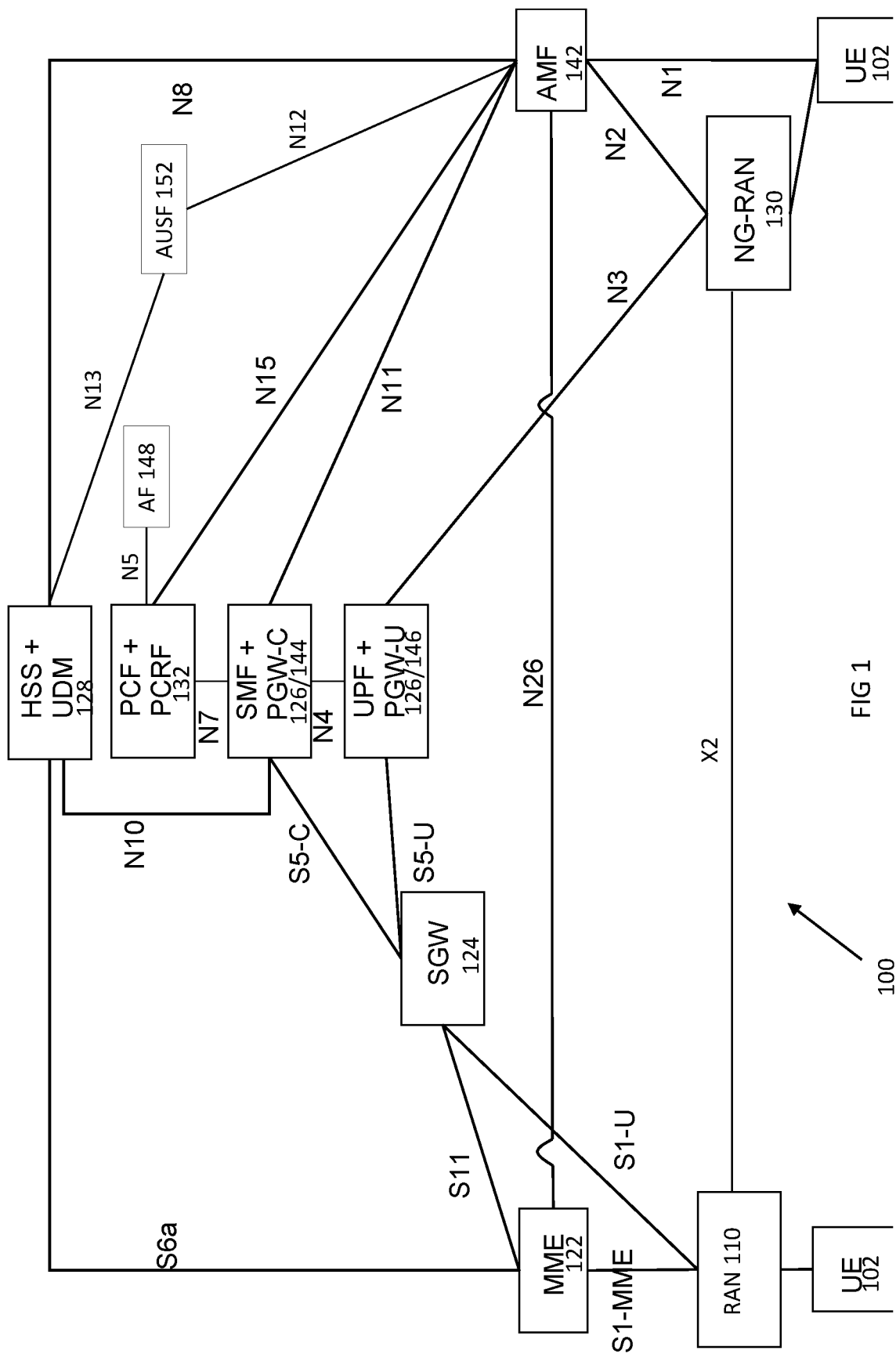
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to radio access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1. Other network functions that are not shown for convenience may include a Network Exposure function (NEF) that supports exposure of capabilities and events, secures the provision of information from an external application to a 3GPP network, and supports translation of internal/external information; a NF Repository function (NRF) that supports a service discovery function and maintains the NF profile and available NF instances; and a Network Slice Selection Function (NSSF) that supports selection of NS instances to serve the UE, determination of the allowed NSSAI, and determination of the AMF set to be used to serve the UE.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
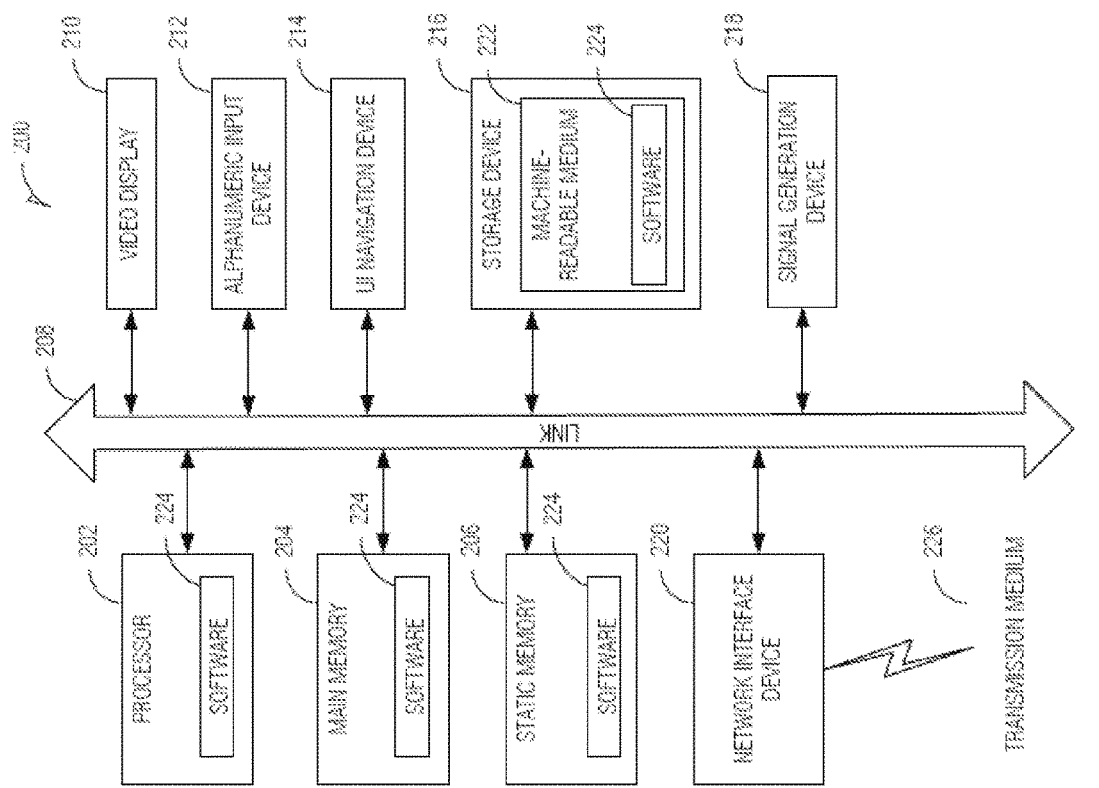
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
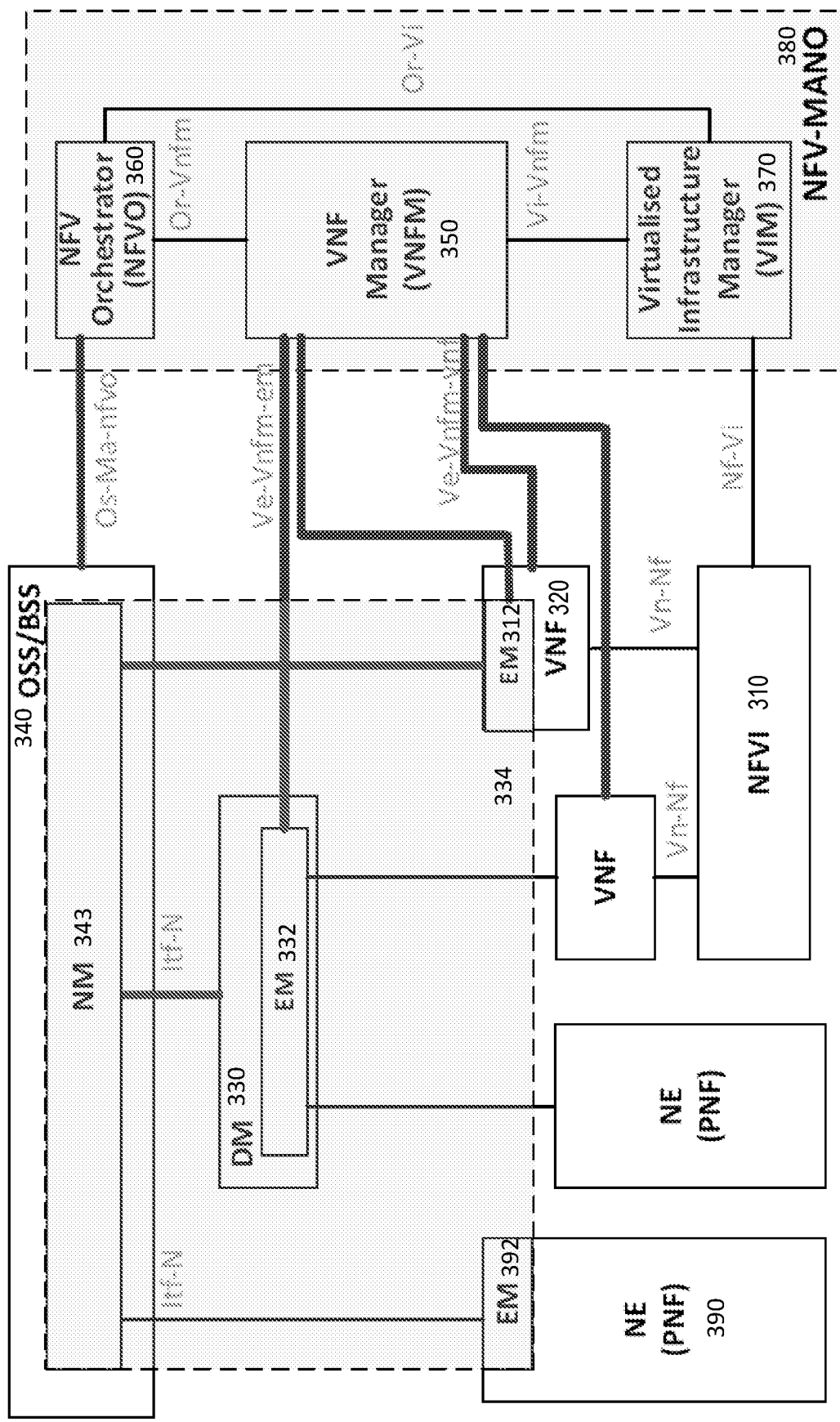
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, the 5G network architecture may contain one or more 5G core (5GC) NFs and the NG RAN that contains one or more gNBs. The functions of a gNB may be split. The functional split feature may split such a gNB into a gNB-Centralized Unit (CU) that implements the upper layer gNB functions and gNB-Distributed Unit (DU) that implements the lower layer gNB functions. The upper layer functions may include RRC and PSC. The gNB-CU may provide functionalities such as the control the transfer of user data, and effect mobility control, radio access network sharing, positioning, and session management, except those functions allocated exclusively to the gNB-DU. The higher protocol layers (PDCP and RRC for the control plane/PDCP and SDAP for the user plane) may be implemented in the gNB-CU, and the RLC, MAC layers, and PHY layer may be implemented in the gNB-DU. The PHY layer may be split, with the higher PHY layer also implemented in the gNB-DU, while the lower PHY layer may be implemented in a Remote Radio Head. The gNB-CU, gNB-DU and Remote Radio Head may be implemented by different manufacturers, but may nevertheless be connected by the appropriate interfaces therebetween. The gNB-CU may be connected with multiple gNB-DUs. The 5GC NFs may include one or more of the NFs described with reference to FIG. 1, such as a UPF, a SMF, a NSSF, a NEF, etc. . . .

Figure 4:
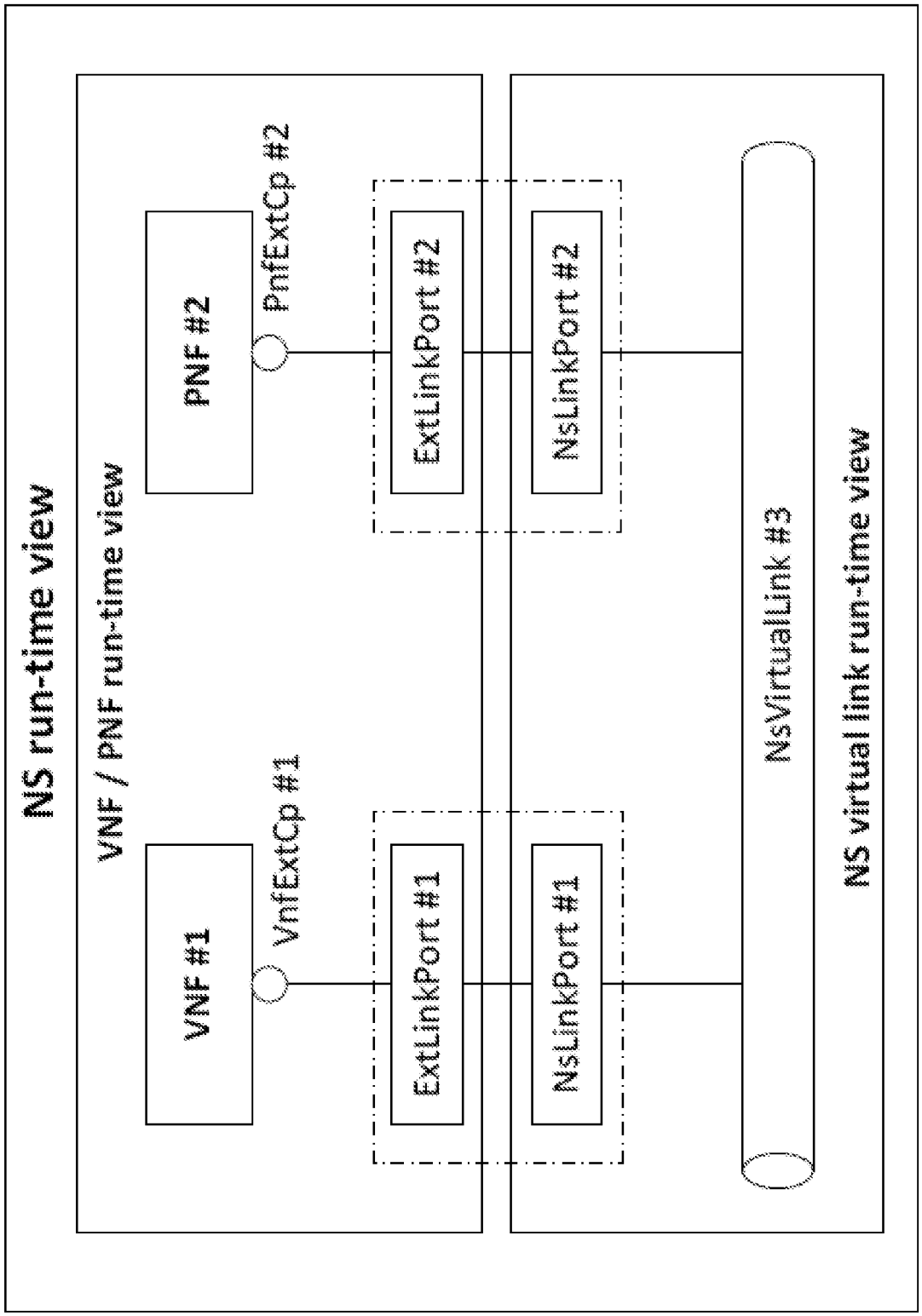
FIG. 4 illustrates a network slice run-time view in accordance with some embodiments.

The 5G CN functions and gNB-CU can be implemented as VNFs. The gNB, as above, can be implemented as a PNF. In some embodiments, an operator can create a virtualized 5G network by using an ETSI NFV lifecycle management function to instantiate a NS in the cloud that contains VNFs (e.g. 5G core NFs, gNB-CU), and PNFs (e.g. gNB-DU). FIG. 4 illustrates a network slice run-time view in accordance with some embodiments. At least some of the same elements as FIGS. 1-3 are shown in FIG. 4. In FIG. 4, the connectivity between the VNF and the PNF is implemented by a NS virtual link. For example, as shown VNF #1 is connected to NS virtual link #3 via VNF external connection point #1 and PNF #2 is connected to NS virtual link #3 via PNF external connection point #2.

In addition to altering the composition of a NS by adding a PNF to a NS or removing the PNF from a NS, the PNF lifecycle management (LCM) may include alteration of the PNF connectivity. That is, the PNF LCM includes adding connectivity to a PNF instance and removing connectivity from a PNF instance.

Figure 5:
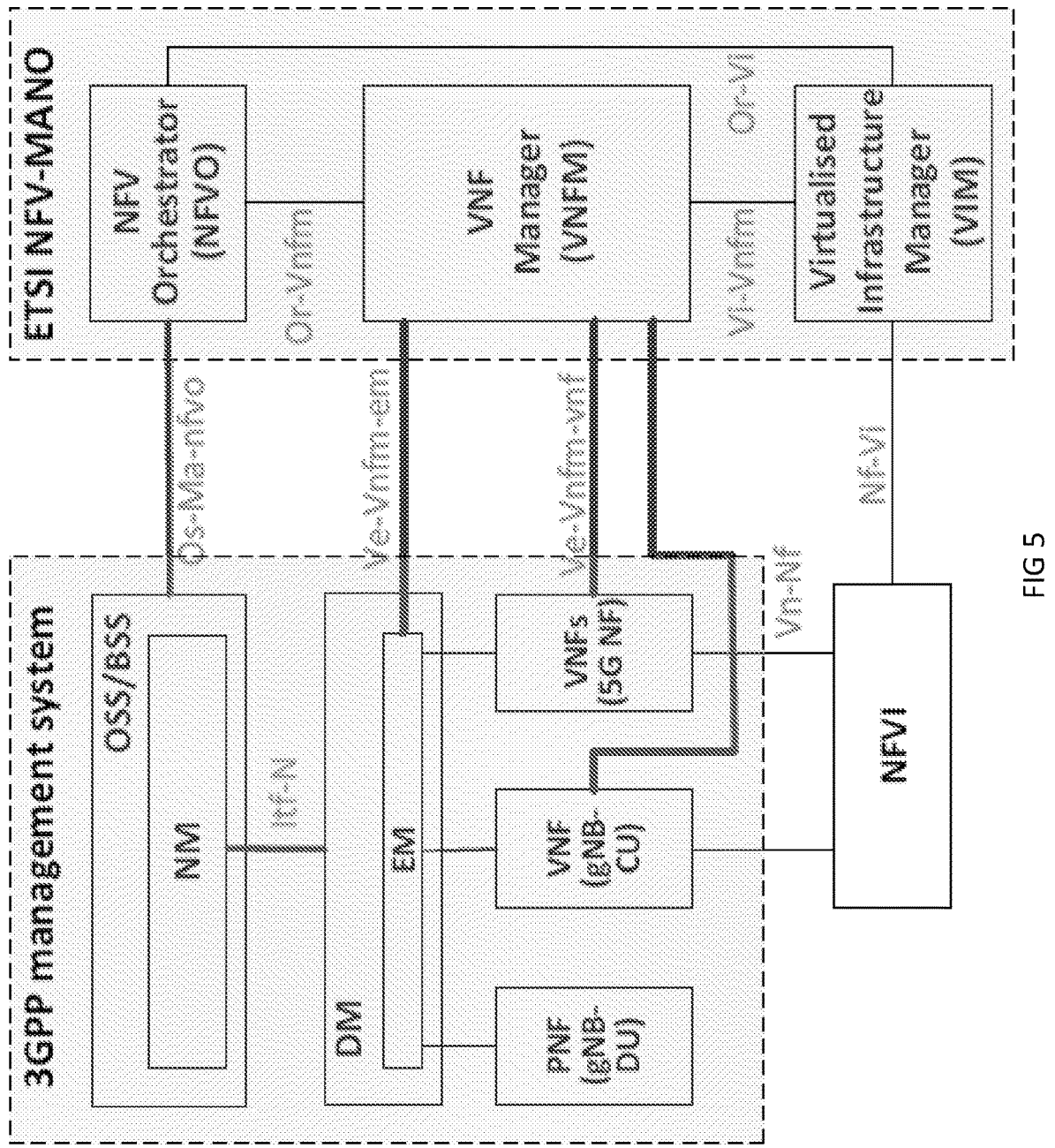
FIG. 5 illustrates another NFV network management architecture in accordance with some embodiments.

FIG. 5 illustrates another NFV network management architecture in accordance with some embodiments. At least some of the same elements shown in FIG. 1-4 are shown in FIG. 5 and will not be described for convenience. Note that the names of the elements shown in FIG. 5 may differ from that indicated in the 3GPP standard, but the functionality remains the same. The 5G network 3GPP management system may be similar to that of 4G networks, with the term Network Management Function (NM) playing a similar role as the NM in 4G. Among other aspects, a PNF (gNB-DU) and VNF (gNB-CU) are contained within the 3GPP management system, as are VNFs that realize the 5G NFs. As above, the VNFs (implementing both the gNB-CU and 5G NFs) may be provided resources by the NFVI and managed by the EM.

The use cases and requirements to provide PNF LCM are indicated below, as shown by the connection in FIG. 4 that connects an external link port of the PNF to a virtual NS link port. The virtual NS link port connected to the PNF may be connected to another virtual NS link port via a virtual link and to a VNF through another virtual NS link port and external link port (of the VNF). To add connectivity to a PNF (instance):

| Use Case | Evolution/Specification | <<Uses>> Related use |
|---|---|---|
| Goal | Add connectivity to a PNF. | |
| Actors and Roles | NM | |
| Telecom resources | NFVO | |
| Assumptions | NM is subscribed to receive the NS LCM notifications. | |
| Pre-conditions | A PNF has been added to a NS with the connectivity to other VNF instance. | |
| Begins when | NM determines (e.g. by operator's request) that it is necessary to add new connectivity to the PNF, since the PNF does not have connectivity in the NS instance or the PNF has been upgraded and additional connectivity is needed (e.g. an eNB needs to connect to new MME). | |
| Step 1 (M) | NM sends a request to the NFVO to update the NS instance to add the connectivity to an existing PNF. | |
| Step 2 (M) | NFVO returns to the NM lifecycleOperationOccurrenceId and processes the request | |
| Step 3 (M) | NFVO sends to NM Lifecycle Change Notification indicating start of the operation. | |
| Step 4 (M) | NFVO sends to NM Lifecycle Change Notifications indicating progress of the operation. | |
| Step 5 (M) | NFVO sends to NM Lifecycle Change Notification indicating result of the operation. | |
| Ends when | All the steps identified above are successfully completed. | |
| Exceptions | One of the steps identified above fails. | |
| Post-conditions | The connectivity has been added to the PNF according to the operator's needs. | |
| Traceability | REQ-NFV_LCM_Os-Ma-nfvo-FUN-x | |

Note that the above use case may be used to add connectivity to a VNF. In some embodiments, a pre-condition is when a PNF instance has been added or instantiated in an NS instance without external connectivity, or a new external connectivity is needed due to a PNF upgrade. The use case may be initiated when the NM determines (e.g. by operator's request) that it is to add external connectivity to an existing PNF instance. To change (e.g., remove) connectivity from a PNF:

| Use Case | Evolution/Specification | <<Uses>> Related use |
|---|---|---|
| Goal | Add connectivity to a PNF. | |
| Actors and Roles | NM | |
| Telecom resources | NFVO | |
| Assumptions | NM is subscribed to receive the NS LCM notifications. | |
| Pre-conditions | A PNF has been added to a NS with connectivity to other PNF/VNF instance(s). | |
| Begins when | NM determines (e.g. by operator's request) that it is necessary to remove the connectivity from the PNF. | |
| Step 1 (M) | NM sends a request to the NFVO to update the NS instance to remove the connectivity from an existing PNF. | |
| Step 2 (M) | NFVO returns to the NM lifecycleOperationOccurrenceId and processes the request | |
| Step 3 (M) | NFVO sends to NM Lifecycle Change Notification indicating start of the operation. | |
| Step 4 (M) | NFVO sends to NM Lifecycle Change Notifications indicating progress of the operation. | |
| Step 5 (M) | NFVO sends to NM Lifecycle Change Notification indicating result of the operation. | |
| Ends when | All the steps identified above are successfully completed. | |
| Exceptions | One of the steps identified above fails. | |
| Post-conditions | The connectivity has been removed from the PNF according to the operator's needs. | |
| Traceability | REQ-NFV_LCM_Os-Ma-nfvo-FUN-y | |

REQ-NFV_LCM_Os-Ma-nfvo-FUN-x: the Os-Ma-nfvo reference point supports a capability allowing the NM to request the addition of connectivity to a PNF as part of NS update.

REQ-NFV_LCM_Os-Ma-nfvo-FUN-y: the Os-Ma-nfvo reference point supports a capability allowing NM to request the change (removal) of connectivity from a PNF as part of NS update.

The following provides enhancement to the NS update operation in ETSI GS NFV-IFA013 to enable a 3GPP NM to request a NFVO to add use cases and requirements to enable operators to add connectivity to a PNF instance or remove connectivity from a PNF instance. One operation may update an NS instance. This operation may also be used to embed VNF LCM operations in support of a fine-grained NS LCM approach. Actions that can be performed with an update include: adding existing VNF instances to the NS instance, removing VNF instances from the NS instance, instantiating new VNF instances and adding them to the NS instance, changing the dedicated file (DF) of VNF instances belonging to the NS instance, changing the operational state of a VNF instance belonging to the NS instance, modifying information data and/or the configurable properties of a VNF instance belonging to the NS instance, changing the external connectivity of a VNF instance belonging to the NS instance, adding Service Access Points (SAPs) to the NS instance, removing SAPs from the NS instance, adding existing NS instances to the NS instance, removing nested NS instances from the NS instance, associating a new Network Service Descriptor (NSD) version to the NS instance, moving VNF instances from one NS instance to another NS instance, adding VNF Forwarding Graphs (VNFFGs) to the NS instance, removing VNFFGs from the NS instance, updating VNFFGs of the NS instance, changing the DF of the NS instance, adding PNFs to the NS instance, modifying PNFs in the NS instance, removing PNFs from the NS instance, adding the external connectivity to a PNF belonging to the NS instance, and removing the external connectivity from a PNF belonging to the NS instance. However, only one type of update may be allowed per operation.

Table 1 lists the information flow exchanged between the OSS/BSS and the NFVO. It is possible, however, to request several updates of a given type in one Update NS operation.

TABLE 1

| Update NS operation | | |
| --- | --- | --- |
| Message | Requirement | Direction |
| UpdateNsRequest | Mandatory | OSS/BSS → NFVO |
| UpdateNsResponse | Mandatory | NFVO → OSS/BSS |

The input parameters sent when invoking the operation may follow the indications provided in Table 2.

| Parameter | Qualifier | Cardinality | Content | Description |
| --- | --- | --- | --- | --- |
| nsInstanceId | M | 1 | Identifier | Identifier of the NS instance being updated. |
| updateType | M | 1 | Enum | Specifies the type of update. This parameter determines also which one of the following parameter is present in the operation. Posable values are: AddVnf (adding existing VNF instance(s)). RemoveVnf (removing VNF instance(s)). InstantiateVnf (instantiating new VNF(s)). ChangeVnfDf (Changing VNF DF). OperateVnf (changing VNF state). ModifyVnfInformation (modifying VNF information and/or the configurable properties of VNF instance(s)). ChangeExtVnfConnectivity (changing the external connectivity of VNF instance(s)). AddSap (adding SAP(s)). RemoveSap (removing SAP(s)). AddNestedNs (adding existing NS instance(s) as nested NS(s)). RemoveNestedNs (removing existing nested NS instance(s)). AssocNewNsdVersion (associating a new NSD version to the NS instance). MoveVnf (moving VNF instance(s) from one origin NS instance to a another target NS instance). AddVnffg (adding VNFFG(s)). RemoveVnffg (removing VNFFG(s)). UpdateVnffg (updating VNFFG(s)). ChangeNsDf (changing NS DF). |

-continued

| Parameter | Qualifier | Cardinality | Content | Description |
|---|---|---|---|---|
| | | | | AddPnf (adding PNF).<br>ModifyPnf(modify PNF)<br>RemovePnf (removing PNF).<br>AddExtPnfConnectivity (add the external connectivity to a PNF)<br>RemoveExtPnfConnectivity (remove the external connectivity from a PNF) |
| addVnfInstance | M | 0 ... N | VnfInstanceData | Specify an existing VNF instance to be added to the NS instance.<br>This parameter shall be present only if updateType = AddVnf. |
| removeVnfInstanceId | M | 0 ... N | Identifier | Specify an existing VNF instance to be removed from the NS instance.<br>The parameter contains the identifier(s) of the VNF instances to be removed.<br>This parameter shall be present only if updateType = RemoveVnf. See note 1. |
| instantiateVnfData | M | 0 ... N | InstantiateVnfData | Specify the new VNF to be instantiated. This parameter can be used e.g. for the bottom-up NS creation.<br>This parameter shall be present only if updateType = InstantiateVnf. |
| changeVnfFlavourData | M | 0 ... N | ChangeVnfFlavourData | Specify the new DF of the VNF instance to be changed to. This parameter shall be present only if updateType = ChangeVnfDf. |
| operateVnfData | M | 0 ... N | OperateVnfData | Specify the state of the VNF instance to be changed. This parameter shall be present only if updateType = OperateVnf. |
| modifyVnfInfoData | M | 0 ... N | ModifyVnfInfoData | Specify the VNF information parameters and/or the configurable properties of VNF instance to be modified. This parameter shall be present only if updateType = ModifyVnfInformation. |
| changeExtVnfConnectivityData | M | 0 ... N | ChangeExtVnfConnectivityData | Specify the new external connectivity data of the VNF instance to be changed. This parameter shall be present only if updateType = ChangeExtVnfConnectivity. |
| addSap | M | 0 ... N | SapData | Specify a new SAP to be added to the NS instance.<br>This parameter shall be present only if updateType = AddSap. |
| removeSapId | M | 0 ... N | Identifier | Specify an existing SAP to be removed from the NS instance.<br>The parameter shall be present only if updateType = RemoveSap. |
| addNestedNsId | M | 0 ... N | Identifier | Specify an existing nested NS instance to be added to (nested within) the NS instance.<br>This parameter shall be present only if updateType = AddNestedNs. |
| removeNestedNsId | M | 0 ... N | Identifier | Specify an existing nested NS instance to be removed from the NS instance.<br>The parameter shall be present only if updateType = RemoveVnfNestedNs. |
| assocNewNsdVersionData | M | 0 ... 1 | AssocNewNsdVersionData | Specify the new NSD to be used for the NS instance. This parameter shall be present only if updateType = AssocNewNsdVersion. |
| moveVnfInstanceData | M | 0 ... N | MoveVnfInstanceData | Specify existing VNF instance to be moved from one NS instance to another NS instance. This parameter shall be present only if updateType = MoveVnf. |
| addVnffg | M | 0 ... N | AddVnffgData | Specify the new VNFFG to be created to the NS instance. This parameter shall be present only if updateType = AddVnffg. |
| removeVnffgId | M | 0 ... N | Identifier | Identifier of an existing VNFFG to be removed from the NS instance. This parameter shall be present only if updateType = RemoveVnffg. |
| updateVnffg | M | 0 ... N | UpdateVnffgData | Specify the new VNFFG information data to be updated for a VNFFG of the NS instance. This parameter shall be present only if updateType = UpdateVnffg. |
| changeNsFlavourData | M | 0 ... 1 | ChangeNsFlavourData | Specifies the new DF to be applied to the NS instance. It shall be present only if updateType = ChangeNsDf. |

-continued

| Parameter | Qualifier | Cardinality | Content | Description |
|---|---|---|---|---|
| updateTime | M | 0 . . . 1 | DateTime | Timestamp indicating the update time of the NS, i.e. the NS will be updated at this timestamp. Cardinality "0" indcates the NS update takes place immediately. |
| addPnfData | M | 0 . . . N | AddPnfData | Information of the PNF(s) that are being added into the NS instance. This parameter shall be present only if updateType = AddPnf. |
| modifyPnfData | M | 0 . . . N | ModifyPnfData | Information on the PNF(s) that are being modified in this NS instance. This parameter shall be present only if updateType = ModifyPnf. See note 2 |
| removePnfId | M | 0 . . . N | Identifier | Identifier of the PNF(s) that are part of this NS instance and that should be deleted from it. This parameter shall be present only if updateType = RemovePnf. |
| addExtPnfConnectivityData | M | 0 . . . N | AddExtPnfConnectivityData | Information of the external connectivity to be added to a PNF belonging to the NS instance. This parameter shall be present only if updateType = AddPnfConnectivity. |
| RemoveExtPnfConnectivityData | M | 0 . . . N | RemoveExtPnfConnectivityData | Information of the external connectivity to be removed from a PNF belonging to the NS instance. This parameter shall be present only if updateType = RemovePnfConnectivity. |

NOTE 1:
If a VNF instance is removed from an NS and this NS was the last one for which this VNF instance was a part, the VNF instance is terminated by the NFVO.
NOTE 2:
New CP addresses should be contained in the element, if PNF CPs need to be changed.

The following lists two procedures to enable operators to add connectivity to a PNF instance or remove connectivity from a PNF instance. The AddExtPnfConnectivityData information element may provide the information of external connectivity to be added to a PNF. Table 3 provides the indications of the AddExtPnfConnectivityData information element.

TABLE 3

Attributes of the AddExtPnfConnectivityData information element

| Attribute | Qualifier | Cardinality | Content | Description |
|---|---|---|---|---|
| pnfId | M | 1 | Identifier | Identifier of the PNF. Assigned by OSS and provided to NFVO. |
| cpData | M | 0 . . . N | PnfExtCpData | Information on the external CP of the PNF. |
| extLinkPorts | M | 1 . . . N | ExtLinkPortData | Externally provided link ports to be used to connect external connection points to this external VL. |

Similarly, the RemoveExtPnfConnectivityData information element may provide the information of external connectivity to be removed from a PNF. Table 4 provides the indications of the RemoveExtPnfConnectivityData information element.

TABLE 4

Attributes of the RemoveExtPnfConnectivityData information element

| Attribute | Qualifier | Cardinality | Content | Description |
|---|---|---|---|---|
| pnfId | M | 1 | Identifier | Identifier of the PNF. Assigned by OSS and provided to NFVO. |
| cpInstanceId | M | 1 . . . N | Identifier | Identifier of the external CP instance to be removed from the PNF. |

Figure 6:
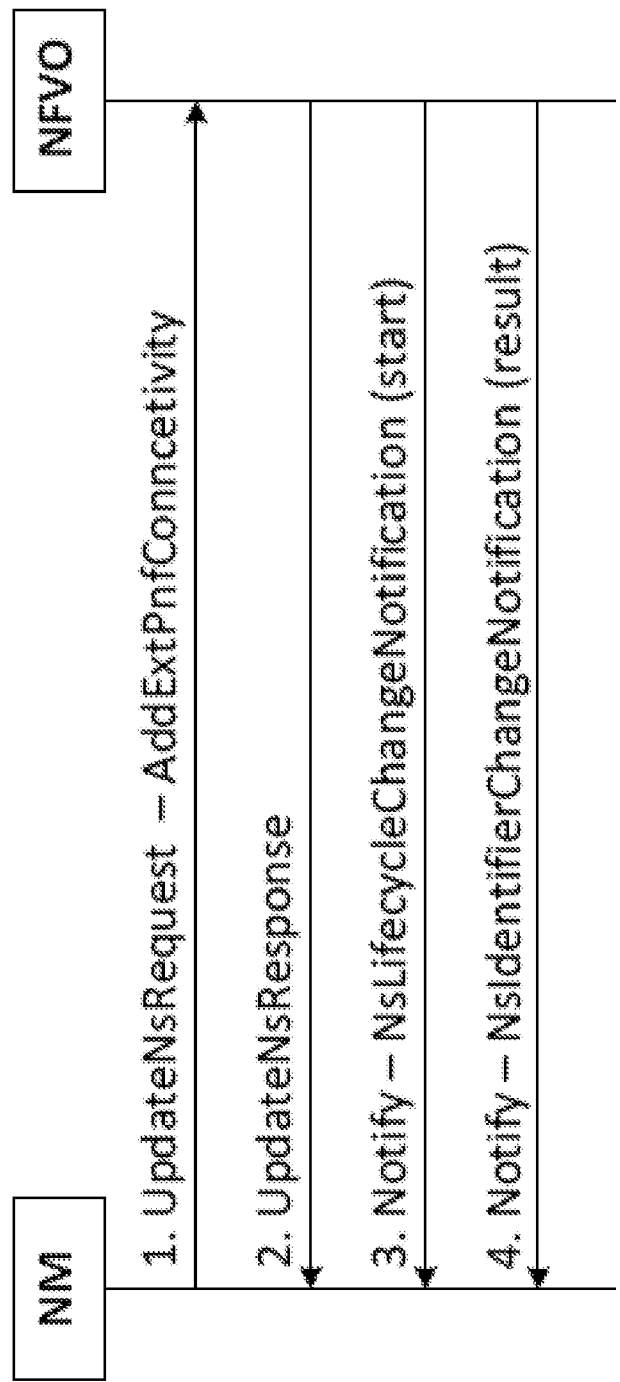
FIG. 6 illustrates a network slice (NS) update to add external connectivity to a PNF in accordance with some embodiments.

FIG. 6 illustrates a NS update to add external connectivity to a PNF in accordance with some embodiments. It is assumed that the PNF already exists in the NS instance. As shown, to initiate the addition of external connectivity to the PNF, the NM may send to the NFVO an UpdateNsRequest message with the following parameters to on-board the NSD: nsInstanceId: the identifier of the NS instance being updated; updateType="AddExtPnfConnectivity" to indicate the type of update operation; and addExtPnfConnctivityData: the PNF information that contains the following attributes: pnfId: the identifier of the PNF, cpData: information of the external CP of the PNF, and extLinkPorts: externally provided link ports to be used to connect external connection points to the external virtual link (VL).

The NFVO may, in response to reception of the UpdateNsRequest message, send to the NM an UpdateNsResponse message with the attribute lifecycleOperationOccurrenceId. The lifecycleOperationOccurrenceId is the identifier of the NS lifecycle operation occurrence. The lifecycleOperationOccurrenceId may be generated for most lifecycle operation occurrences.

After reception of the UpdateNsResponse message, the NFVO may send to the NM a Notify message carrying an NsLifecycleChangeNotification information element. The NsLifecycleChangeNotification information element may contain the attributes nsInstanceId, lifecycleOperationOccurrenceId, operation="NsUpdate", and notificationType="start" to indicate the start of the NS instantiation. The NS instantiation, in this case, may be the addition of the external connectivity to the PNF.

After transmission of the NsLifecycleChangeNotification information element, the NFVO may send to the NM a Notify message an NsLifecycleChangeNotification information element. The NsLifecycleChangeNotification information element may contain the attributes nsInstanceId, lifecycleOperationOccurrenceId, operation="NsUpdate", and notificationType="result" to indicate the end result of the NS instantiation (e.g., success or failure of the addition of the external connectivity to the PNF).

Figure 7:
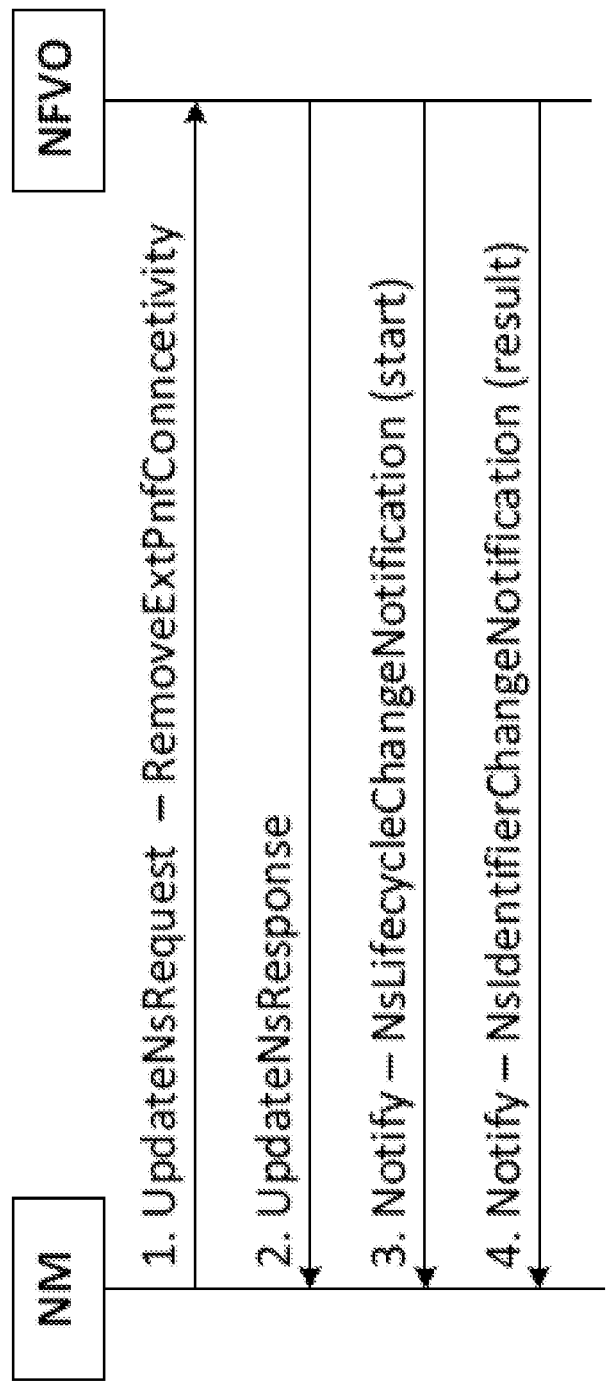
FIG. 7 illustrates a NS update to remove external connectivity from a PNF in accordance with some embodiments.

FIG. 7 illustrates a NS update to remove external connectivity from a PNF in accordance with some embodiments. As in FIG. 6, it is assumed that the external connectivity to be removed is associated with the PNF. As shown, to initiate the removal of external connectivity from the PNF, the NM may send to the NFVO an UpdateNsRequest message to on-board the NSD. The UpdateNsRequest message may have the attributes: nsInstanceId: the identifier of the NS instance being updated; updateType="RemoveExtPnfConnectivity" to indicate the type of update operation; and removeExtPnfConnctivityData: the PNF information that contains the following attributes: pnfId: the identifier of the PNF and cpInstanceId: the identifier of the external CP instance to be removed from the PNF.

The NFVO may, in response to reception of the UpdateNsRequest message, send to the NM an UpdateNsResponse with the attribute lifecycleOperationOccurrenceId. As above, the attribute lifecycleOperationOccurrenceId may be the identifier of the NS lifecycle operation occurrence.

After reception of the UpdateNsResponse message, the NFVO may send to the NM a Notify message carrying an NsLifecycleChangeNotification information element. The NsLifecycleChangeNotification information element may contain the attributes nsInstanceId, lifecycleOperationOccurrenceId, operation="NsUpdate", and notificationType="start" to indicate the start of the NS instantiation. The NS instantiation, in this case, may be the removal of the external connectivity to the PNF.

After transmission of the NsLifecycleChangeNotification information element, the NFVO may send to the NM a Notify message an NsLifecycleChangeNotification information element. The NsLifecycleChangeNotification information element may contain the attributes nsInstanceId, lifecycleOperationOccurrenceId, operation="NsUpdate", and notificationType="result" to indicate the end result of the NS instantiation.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory; and
   one or more processors in communication with the memory and configured to:
   generate a network slice (NS) update request to a Network Function Virtualization Orchestrator (NFVO) to add external connectivity to an existing physical network function (PNF) in an NS instance;
   receive, from the NFVO in response to transmission of the NS update request, an NS update response that contains a lifecycle operation occurrence identifier, the lifecycle operation occurrence identifier identifying an NS lifecycle operation occurrence; and
   after reception of the lifecycle operation occurrence identifier:
   receive a first NS lifecycle change notification from the NFVO that indicates a start of the NS, the first NS lifecycle change comprising the lifecycle operation occurrence identifier; and
   subsequently receive a second NS lifecycle change notification from the NFVO that indicates an end result of the NS update and the lifecycle operation occurrence identifier.

2. The apparatus of claim 1,
wherein the NS update request comprises:
   an identifier of the NS instance to be updated;
   an indication of a type of update operation requested by the NS update request; and
   information of the PNF connectivity to be changed.

3. The apparatus of claim 1,
wherein information associated with PNF connectivity to be changed comprises:
   an identifier of the PNF,
   information of an external connection point of the PNF, and
   externally provided link ports to be used to connect external connection points to an external virtual link (VL).

4. The apparatus of claim 3,
wherein one or more processors are further configured to:
   assign the identifier of the PNF.

5. The apparatus of claim 1,
wherein information associated with PNF connectivity to be changed comprises:
   an AddExtPnfConnectivityData information element that is present if an indication of a type of update operation indicates addition of PNF connectivity and is not present if the indication of the type of update operation indicates removal of PNF connectivity.

6. The apparatus of claim 1,
wherein information associated with PNF connectivity to be changed comprises:
 a RemoveExtPnfConnectivityData information element that is present if an indication of a type of update operation indicates removal of PNF connectivity and is not present if the indication of the type of update operation indicates of addition PNF connectivity.

7. The apparatus of claim 1,
wherein information associated with PNF connectivity to be changed comprises a greater number of attributes if a type of update operation indicates of addition PNF connectivity than if an indication of the type of update operation indicates removal of PNF connectivity.

8. A method, comprising:
generating a network service (NS) update request to a Network Function Virtualization Orchestrator (NFVO) to add external connectivity to an existing physical network function (PNF) in a network service instance;
receiving, from the NFVO in response to transmission of the network service update request, a network service update response that contains a lifecycle operation occurrence identifier, the lifecycle operation occurrence identifier identifying a network service lifecycle operation occurrence; and
after reception of the lifecycle operation occurrence identifier:
 receiving a first network service lifecycle change notification from the NFVO that indicates a start of the network service, the first network service lifecycle change comprising the lifecycle operation occurrence identifier; and
 subsequently receiving a second network service lifecycle change notification from the NFVO that indicates an end result of the network service update and the lifecycle operation occurrence identifier.

9. The method of claim 8,
wherein the network service update request comprises:
 an identifier of the network service instance to be updated;
 an indication of a type of update operation requested by the network service update request; and
 information of the PNF connectivity to be changed.

10. The method of claim 8,
wherein information associated with PNF connectivity to be changed comprises:
 an identifier of the PNF,
 information of an external connection point of the PNF, and
 externally provided link ports to be used to connect external connection points to an external virtual link (VL).

11. The method of claim 10, further comprising:
assigning the identifier of the PNF.

12. The method of claim 8,
wherein information associated with PNF connectivity to be changed comprises:
 an AddExtPnfConnectivityData information element that is present if an indication of a type of update operation indicates addition of PNF connectivity and is not present if the indication of the type of update operation indicates removal of PNF connectivity.

13. The method of claim 8,
wherein information associated with PNF connectivity to be changed comprises:
 a RemoveExtPnfConnectivityData information element that is present if an indication of a type of update operation indicates removal of PNF connectivity and is not present if the indication of the type of update operation indicates of addition PNF connectivity.

14. The method of claim 8,
wherein information associated with PNF connectivity to be changed comprises a greater number of attributes if a type of update operation indicates of addition PNF connectivity than if an indication of the type of update operation indicates removal of PNF connectivity.

15. The method of claim 8,
wherein the NS update request comprises an UpdateNsRequest message.

16. The method of claim 15,
wherein the UpdateNsRequest message comprises:
 an nsInstanceId to identify the network service instance being updated;
 an updateType="AddExtPnfConnectivity" to indicate a type of update operation; and
 an addExtPnfConnectivityData.

17. A non-transitory computer readable memory medium storing program instructions executable by a processor of a network manager (NM), as part of a procedure for a network slice (NS) update to add external connectivity to an existing physical network function (PNF) in a network service instance, to:
 generate a network service update request to Network Function Virtualization Orchestrator (NFVO) to add external connectivity to the existing PNF in a network service instance associated with the PNF;
 receive, from the NFVO, a Notify carrying an NsLifecycleChangeNotification information element;
 send, to the NFVO through an Os-Manfvo reference point, an UpdateNsRequest including parameters of a network service instance identifier (ID), an updateType to indicate the type of update operation, and a PNF ID;
 receive, from the NFVO, an UpdateNsResponse including a lifecycle operation occurrence ID that is an ID of a network service lifecycle operation occurrence;
 receive, from the NFVO, a Notify including an attribute notificationType="start"; and
 receive, from the NFVO, a Notify including an attribute notificationType="result".

18. The non-transitory computer readable memory medium of claim 17,
wherein the NsLifecycleChangeNotification information element includes an nsInstanceId attribute, a lifecycleOperationOccurrenceId attribute, an operation="NsUpdate", and a notificationType.

19. The apparatus of claim 1,
wherein the NS update request comprises an UpdateNsRequest message.

20. The apparatus of claim 1,
wherein the UpdateNsRequest message comprises:
 an nsInstanceId to identify the network service instance being updated;
 an updateType="AddExtPnfConnectivity" to indicate a type of update operation; and
 an addExtPnfConnectivityData.

\* \* \* \* \*